US 12,516,682 B2

(12) United States Patent
Kabasawa

(10) Patent No.: US 12,516,682 B2
(45) Date of Patent: Jan. 6, 2026

(54) VACUUM PUMP, ROTATING BODY FOR VACUUM PUMP, AND BALANCE CORRECTING MEMBER FOR VACUUM PUMP

(71) Applicant: Edwards Japan Limited, Chiba (JP)

(72) Inventor: Takashi Kabasawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 0 days.

(21) Appl. No.: 18/849,266

(22) PCT Filed: Mar. 29, 2023

(86) PCT No.: PCT/JP2023/012732
§ 371 (c)(1),
(2) Date: Sep. 20, 2024

(87) PCT Pub. No.: WO2023/190641
PCT Pub. Date: Oct. 5, 2023

(65) Prior Publication Data
US 2025/0215900 A1  Jul. 3, 2025

(30) Foreign Application Priority Data

Apr. 1, 2022  (JP) ................................. 2022-061695
Sep. 1, 2022  (JP) ................................. 2022-139052

(51) Int. Cl.
*F04D 29/66* (2006.01)
*F04D 19/04* (2006.01)
*F16F 1/373* (2006.01)

(52) U.S. Cl.
CPC ......... *F04D 29/662* (2013.01); *F04D 19/042* (2013.01); *F16F 1/373* (2013.01)

(58) Field of Classification Search
CPC ...... F04D 19/04; F04D 19/042; F04D 19/044; F04D 19/046; F04D 19/048;
(Continued)

(56) References Cited

U.S. PATENT DOCUMENTS 3,273,419 A * 9/1966 Kollmann ............... F16F 15/32
464/180
6,709,226 B2 * 3/2004 Maejima ................. F04D 19/04
415/118
(Continued)

FOREIGN PATENT DOCUMENTS

EP  2902636 A1  8/2015
JP  2002327697 A  11/2002
(Continued)

OTHER PUBLICATIONS

PCT International Search Report dated Jun. 27, 2023 for corresponding PCT application Serial No. PCT/JP2023/012732, 2 pages.
(Continued)

*Primary Examiner* — Courtney D Heinle
*Assistant Examiner* — Behnoush Haghighian
(74) *Attorney, Agent, or Firm* — Theodore M. Magee; Westman, Champlin & Koehler, P.A.

(57) ABSTRACT

A vacuum pump is provided in which a balance correction member can be reduced in size and is easily attachable. The vacuum pump includes a main body casing, a rotating body, and a motor. The rotating body and the motor are provided in the main body casing. A groove portion is provided in an inner circumference surface of the rotating body. A weight that is plate shaped is placed in the groove portion. The weight has elastic displacement portions and is held and fixed in the groove portion. The elastic displacement portions are formed by opening displacement permitting holes each having one open end in the weight.

6 Claims, 12 Drawing Sheets

(58) Field of Classification Search
CPC ........ F04D 29/662; F01D 5/027; G01M 1/32; G01M 1/36; F16F 1/368; F16F 1/373; F16F 1/376; F16F 1/027
USPC .................................................. 267/158, 160
See application file for complete search history.

(56) References Cited

U.S. PATENT DOCUMENTS

| | | | | |
|---|---|---|---|---|
| 6,890,145 | B2* | 5/2005 | Takamine | ............... F04D 19/04 415/217.1 |
| 2002/0159899 | A1* | 10/2002 | Yamashita | ............... F04D 19/04 417/423.4 |
| 2003/0095860 | A1* | 5/2003 | Takamine | ............... F04D 19/04 415/90 |

FOREIGN PATENT DOCUMENTS

| | | | |
|---|---|---|---|
| JP | 2003148389 | A | 5/2003 |
| JP | 201301145 | A | 5/2013 |
| JP | 2018127950 | A | 8/2018 |

OTHER PUBLICATIONS

British Combined Search and Examination Report dated Dec. 5, 2022 and Search Report dated Dec. 2, 2022 for corresponding British application Serial No. GB2209798.4, 5 pages.

\* cited by examiner

Fig. 5
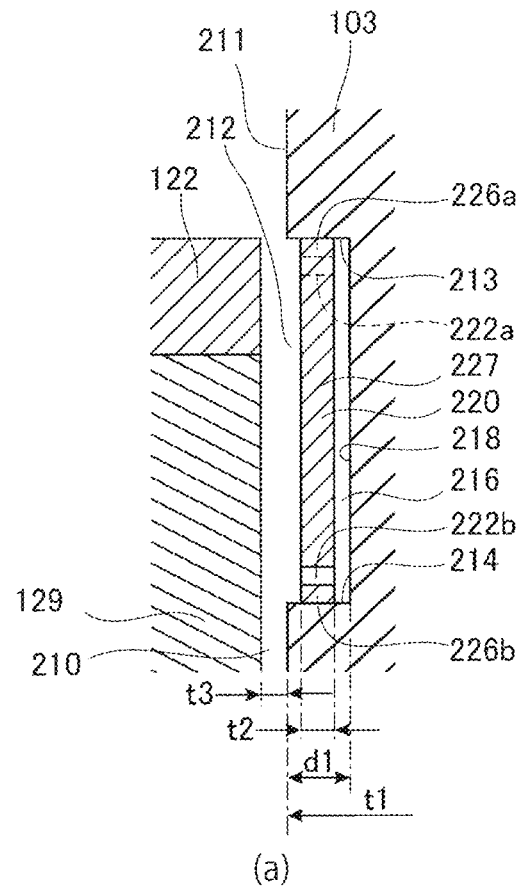
(a)
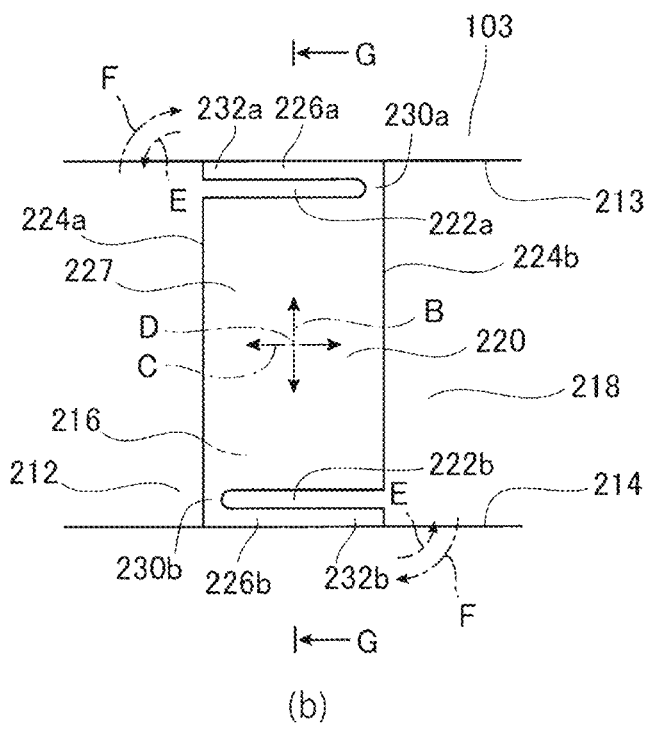
(b)

Fig. 8
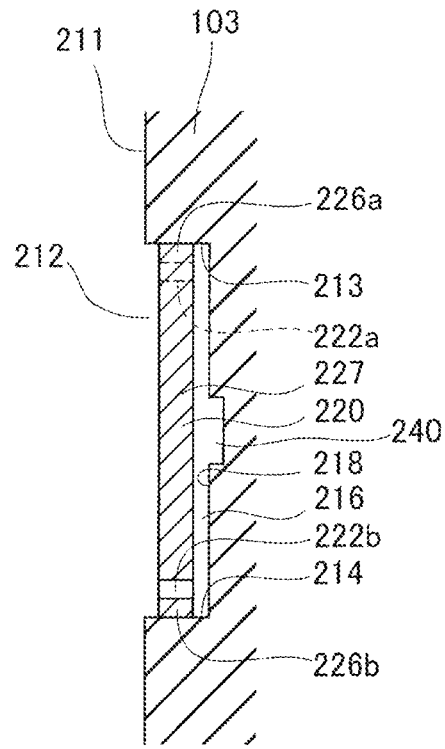
(a)
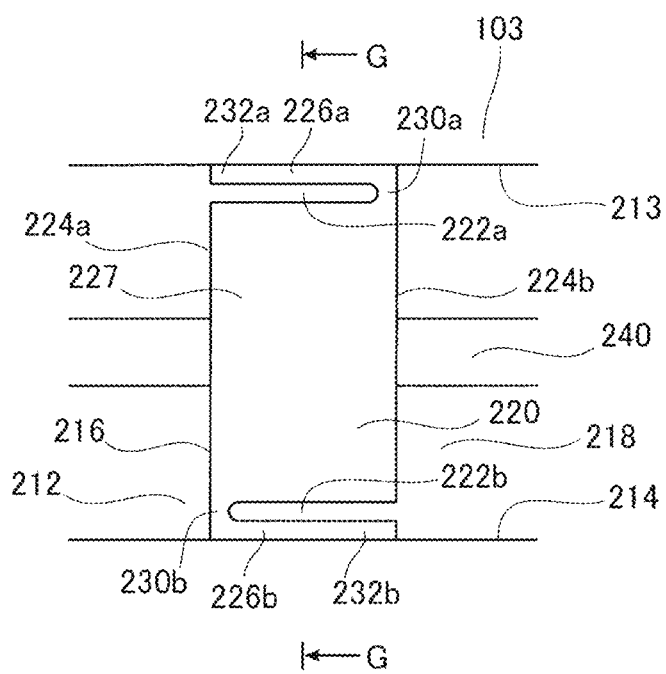
(b)

Fig. 9
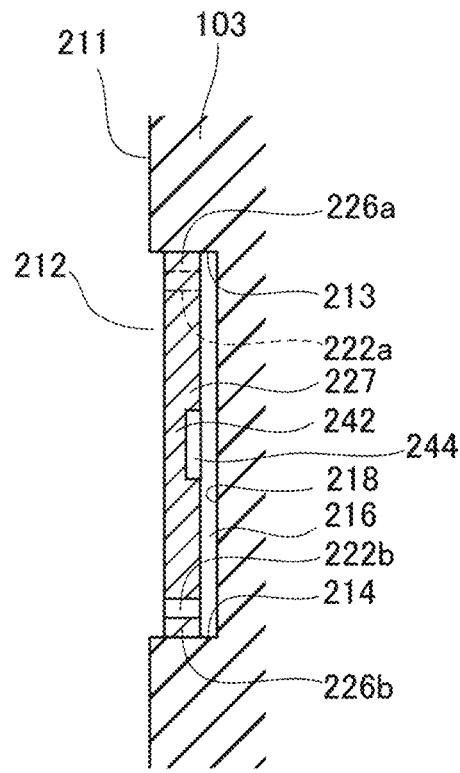
(a)
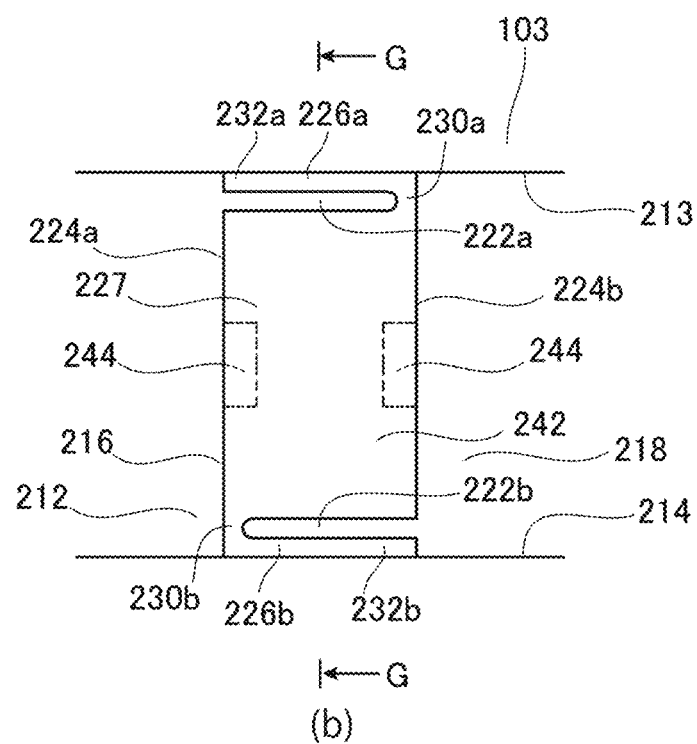
(b)

Fig. 11
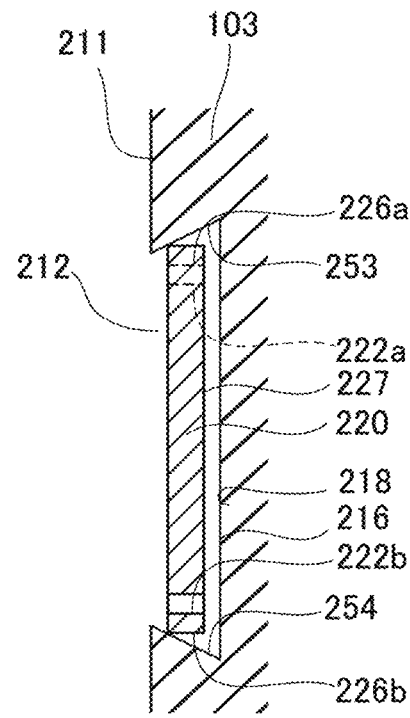
(a)
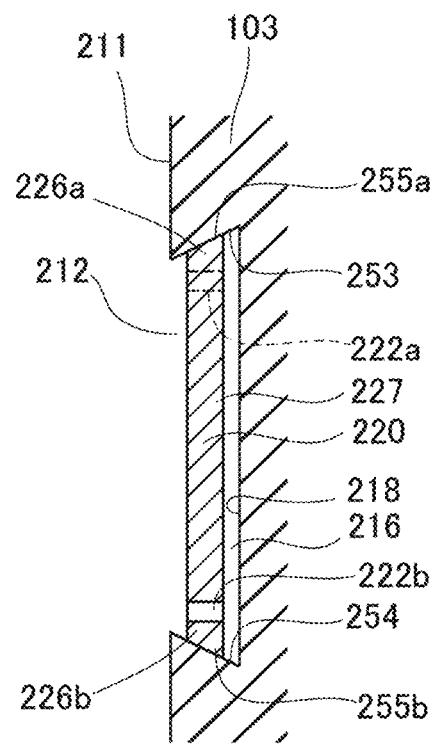
(b)

Fig. 12
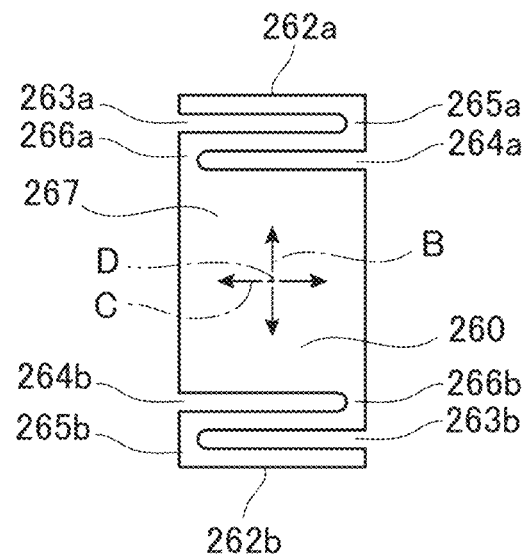
(a)
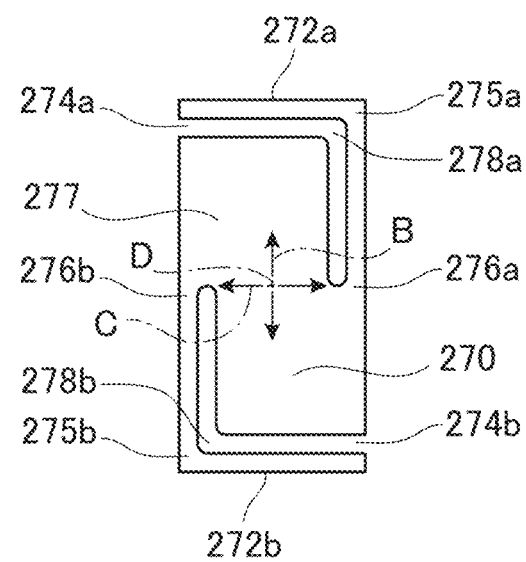
(b)

Fig. 13
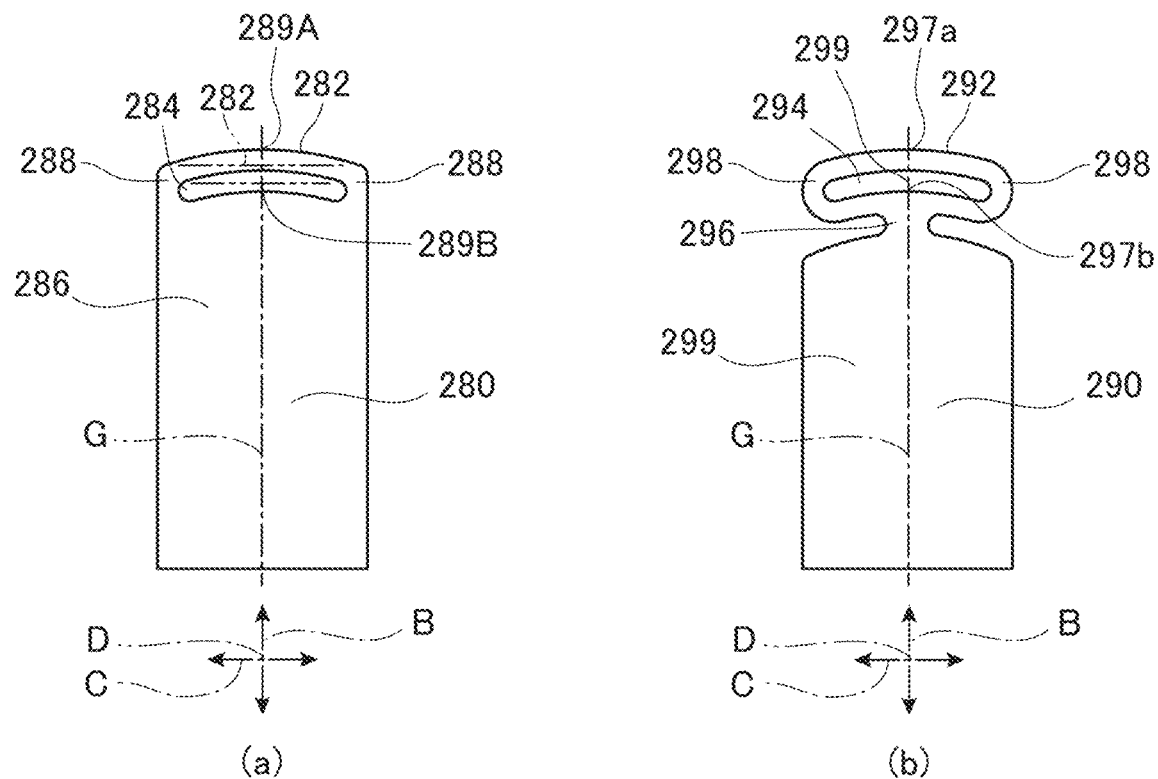
(a) (b)
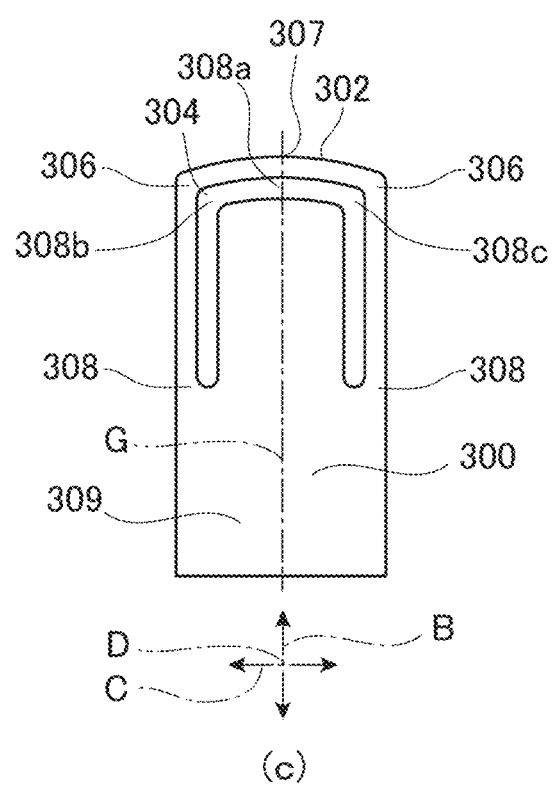
(c)

US 12,516,682 B2

VACUUM PUMP, ROTATING BODY FOR VACUUM PUMP, AND BALANCE CORRECTING MEMBER FOR VACUUM PUMP

CROSS-REFERENCE OF RELATED APPLICATION

This application is a Section 371 National Stage Application of International Application No. PCT/JP2023/012732, filed Mar. 29, 2023, which is incorporated by reference in its entirety and published as WO 2023/190641A1 on Oct. 5, 2023 and which claims priority of Japanese Application No. 2022-061695, filed Apr. 1, 2022 and Japanese Application No. 2022-139052, filed Sep. 1, 2022.

BACKGROUND

The present invention relates to a vacuum pump, such as a turbomolecular pump, a rotating body for a vacuum pump, and a balance correction member for a vacuum pump.

Turbomolecular pumps are commonly known as one type of vacuum pump. In a turbomolecular pump, the motor in the pump main body is energized to rotate the rotor blades, which hit the gaseous molecules (gas molecules) of the gas (process gas) sucked into the pump main body, thereby exhausting the gas. Such a turbomolecular pump includes a pump of a type having a heater and a cooling pipe to appropriately control the temperature inside the pump.

With a vacuum pump that rotates rotor blades, such as a turbomolecular pump, the weight of the rotor blades needs to be balanced. When the weight is not balanced, a balance correction operation is performed to restore a balance. Japanese Patent Application Publication No. 2018-127950, Japanese Patent Application Publication No. 2003-148389, and Japanese Patent Application Publication No. 2002-327697 describe known methods for weight balance correction.

Japanese Patent Application Publication No. 2018-127950 describes a method of cutting a part of a rotor blade to correct unbalance (for example, paragraph 0010). Japanese Patent Application Publication No. 2003-148389 describes a method of attaching a resin weight (for example, an adhesive) to the inner side of a rotor blade (for example, paragraph 0029) and a method of providing a screw hole in a part of a rotor blade or the like to attach a screw (for example, paragraph 0046). Japanese Patent Application Publication No. 2002-327697 describes a method of providing a groove in the inner side of a rotor blade, to which a weight is fitted by engagement (for example, paragraph 0029).

The discussion above is merely provided for general background information and is not intended to be used as an aid in determining the scope of the claimed subject matter. The claimed subject matter is not limited to implementations that solve any or all disadvantages noted in the background.

SUMMARY

The method of Japanese Patent Application Publication No. 2018-127950 requires the labor of cutting a rotor blade. Also, the rotor blade, once cut, cannot be restored to the original state thereof, whereby the balance correction is difficult to undo.

As for the method of Japanese Patent Application Publication No. 2003-148389 that uses an adhesive, the resin weight may change over time due to corrosion caused by the process gas or volatilization in a vacuum. Additionally, when the rotor blades become hot, the temperature thereof may exceed the heat resistant temperature of the resin. As for the method of Japanese Patent Application Publication No. 2003-148389 that provides a screw hole in a rotor blade, due to the stress concentration occurring during rotation, the design thereof may have to be created by taking this stress concentration into account. Furthermore, when a screw hole is provided in an armature disc, which has a relatively small diameter, for example, the screw can be attached only to a limited area of the armature disc. Also, when a screw is attached to a member with a small diameter, it may be difficult to achieve balance correction because of the short distance to the rotation center (axis).

The method of Japanese Patent Application Publication No. 2002-327697 uses a box-shaped weight, which is difficult to have a smaller size and therefore requires a large space to attach.

It is an object of the present invention to provide a vacuum pump and a rotating body for a vacuum pump in which a balance correction member can be reduced in size and is easily attachable. It is another object of the present invention to provide a balance correction member for a vacuum pump that can be reduced in size and is easily attachable.

(1) A vacuum pump according to the present invention for achieving the above objects includes:
   a casing;
   a rotating body that is enclosed and rotationally supported by the casing; and
   a driving mechanism for the rotating body,
   and a balance correction member that is plate shaped is placed in a recess provided in an inner circumference surface of the rotating body.

(2) A rotating body for a vacuum pump according to the present invention for achieving the above objects is
   a rotating body for a vacuum pump configured to be enclosed and rotationally supported by a casing and driven by a driving mechanism,
   and a recess, in which a balance correction member that is plate shaped is to be placed, is provided in an inner circumference surface.

(3) A balance correction member for a vacuum pump according to the present invention for achieving the above objects is
   a balance correction member for a vacuum pump configured to be attached to a rotating body for a vacuum pump that is enclosed and rotationally supported by a casing and driven by a driving mechanism,
   the balance correction member is plate-shaped, and
   the balance correction member is configured to be placed in a recess provided in an inner circumference surface of the rotating body for a vacuum pump.

According to the present invention, it is possible to provide a vacuum pump and a rotating body for a vacuum pump that allow a balance correction member to be reduced in size and easily attached. Also, according to the present invention, it is possible to provide a balance correction member for a vacuum pump that can be reduced in size and is easily attached.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIG. 5A is an enlarged view of the portion encircled by circle A in FIG. 1, and FIG. 5B is an explanatory diagram showing a weight and its surrounding portion as viewed in a centrifugal direction in a radial direction of the rotating body;

FIG. 8A is a vertical cross-sectional view showing a configuration including detachment grooves in the base surface of a groove portion of a rotating body, and FIG. 8B is an explanatory diagram showing a weight and its surrounding portion as viewed in a centrifugal direction in a radial direction of the rotating body;

FIG. 9A is a vertical cross-sectional view showing a configuration including detachment grooves in the weight, and FIG. 9B is an explanatory diagram showing a weight and its surrounding portion as viewed in a centrifugal direction in a radial direction of the rotating body;

FIG. 11A is a vertical cross-sectional view showing a configuration in which the groove portion is a dovetail groove, and FIG. 11B is a vertical cross-sectional view showing a configuration in which a weight is matched in shape with the dovetail groove;

FIG. 12A is an explanatory diagram showing a weight according to a second embodiment, and FIG. 12B is an explanatory diagram showing a weight according to a third embodiment;

FIG. 13A is an explanatory diagram showing a weight according to a fourth embodiment, FIG. 13B is an explanatory diagram showing a weight according to a fifth embodiment, and FIG. 13C is an explanatory diagram showing a weight according to a sixth embodiment.

DETAILED DESCRIPTION

Figure 1:
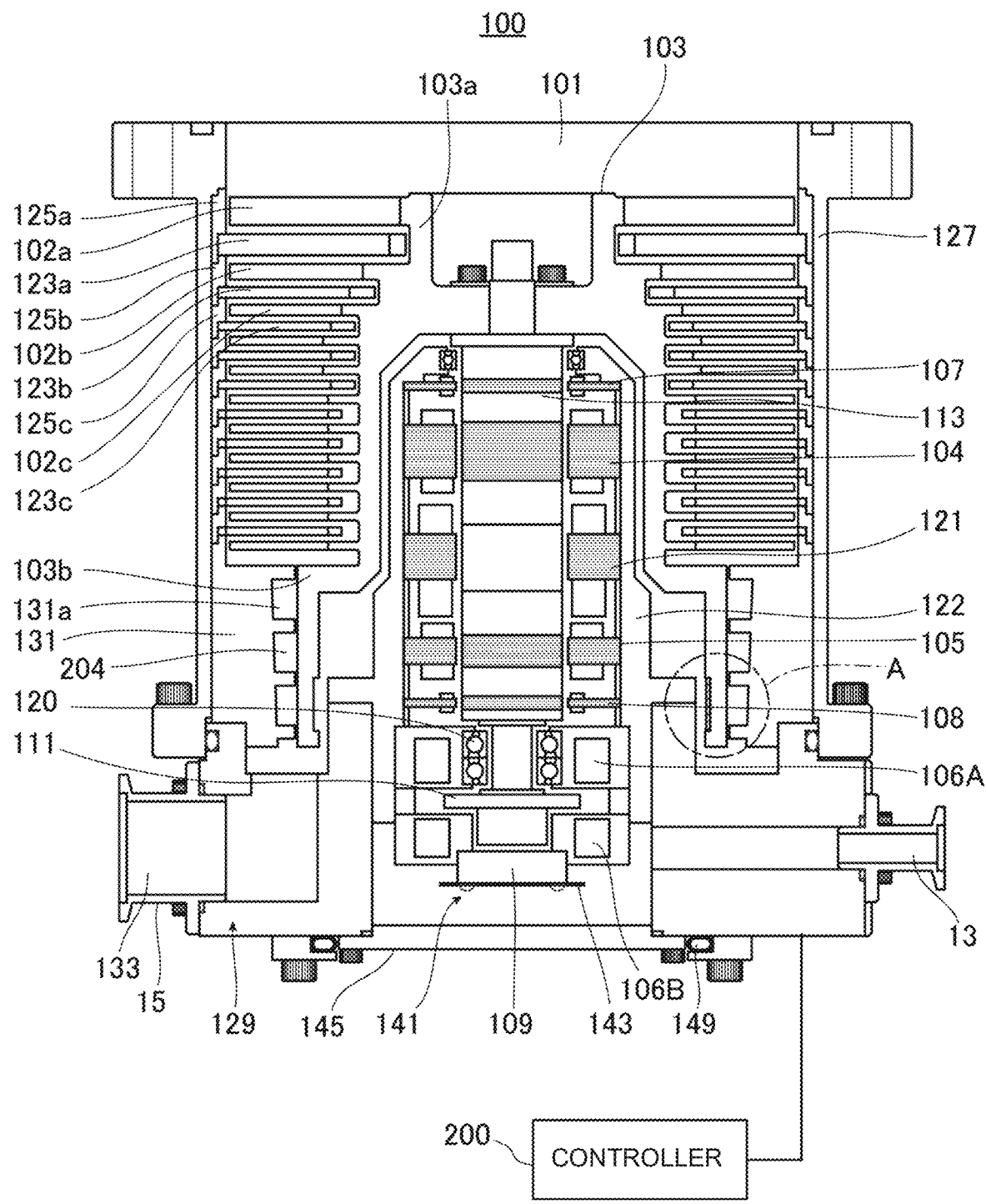
FIG. 1 is an explanatory diagram schematically showing the configuration of a turbomolecular pump according to an embodiment of the present invention.

Referring to the drawings, vacuum pumps according to embodiments of the present invention are now described. FIG. 1 shows a turbomolecular pump 100 as a vacuum pump according to a first embodiment of the present invention. The turbomolecular pump 100 is connected to a vacuum chamber (not shown) of a target device such as a semiconductor manufacturing apparatus.

Basic Configuration of Turbomolecular Pump 100

FIG. 1 is a vertical cross-sectional view of the turbomolecular pump 100. As shown in FIG. 1, the turbomolecular pump 100 includes a circular outer cylinder 127 having an inlet port 101 at its upper end. A rotating body 103 in the outer cylinder 127 includes a plurality of rotor blades 102 (102a, 102b, 102c, . . . ), which are turbine blades for gas suction and exhaustion, in its outer circumference section. The rotor blades 102 extend radially in multiple stages. The rotating body 103 has a rotor shaft 113 in the center, which is suspended in air and position-controlled by a 5-axis magnetic bearing, for example.

Upper radial electromagnets 104 include four electromagnets arranged in pairs on an X-axis and a Y-axis. Four upper radial sensors 107 are provided in close proximity to the upper radial electromagnets 104 and associated with the respective upper radial electromagnets 104. Each upper radial sensor 107 may be an inductance sensor or an eddy current sensor having a conduction winding, for example, and detects the position of the rotor shaft 113 based on a change in the inductance of the conduction winding, which changes according to the position of the rotor shaft 113. The upper radial sensors 107 are configured to detect a radial displacement of the rotor shaft 113, that is, the rotating body 103 fixed to the rotor shaft 113, and send it to the controller 200.

In the controller 200, for example, a compensation circuit having a PID adjustment function generates an excitation control command signal for the upper radial electromagnets 104 based on a signal of the position detected by the upper radial sensors 107. Based on this excitation control command signal, an amplifier circuit 150 (described below) shown in FIG. 2 controls and excites the upper radial electromagnets 104 to adjust the radial position of the upper part of the rotor shaft 113.

The rotor shaft 113 may be made of a high magnetic permeability material (such as iron and stainless steel) and is configured to be attracted by magnetic forces of the upper radial electromagnets 104. The adjustment is performed independently in the X-axis direction and the Y-axis direction. Lower radial electromagnets 105 and lower radial sensors 108 are arranged in a similar manner as the upper radial electromagnets 104 and the upper radial sensors 107 to adjust the radial position of the lower part of the rotor shaft 113 in a similar manner as the radial position of the upper part.

Additionally, axial electromagnets 106A and 106B are arranged so as to vertically sandwich a metal disc 111 (also referred to as an "armature disc"), which has the shape of a circular disc and is provided in the lower part of the rotor shaft 113. The metal disc 111 is made of a high magnetic permeability material such as iron. An axial sensor 109 is provided to detect an axial displacement of the rotor shaft 113 and send an axial position signal to the controller 200.

In the controller 200, the compensation circuit having the PID adjustment function may generate an excitation control command signal for each of the axial electromagnets 106A and 106B based on the signal on the axial position detected by the axial sensor 109. Based on these excitation control command signals, the amplifier circuit 150 controls and excites the axial electromagnets 106A and 106B separately so that the axial electromagnet 106A magnetically attracts the metal disc 111 upward and the axial electromagnet 106B attracts the metal disc 111 downward. The axial position of the rotor shaft 113 is thus adjusted.

As described above, the controller 200 appropriately adjusts the magnetic forces exerted by the axial electromagnets 106A and 106B on the metal disc 111, magnetically levitates the rotor shaft 113 in the axial direction, and suspends the rotor shaft 113 in the air in a non-contact manner. The amplifier circuit 150, which controls and excites the upper radial electromagnets 104, the lower radial electromagnets 105, and the axial electromagnets 106A and 106B, is described below.

The motor 121 includes a plurality of magnetic poles circumferentially arranged to surround the rotor shaft 113. Each magnetic pole is controlled by the controller 200 so as to drive and rotate the rotor shaft 113 via an electromagnetic force acting between the magnetic pole and the rotor shaft 113. The motor 121 also includes a rotational speed sensor (not shown), such as a Hall element, a resolver, or an encoder, and the rotational speed of the rotor shaft 113 is detected based on a detection signal of the rotational speed sensor.

Furthermore, a phase sensor (not shown) is attached adjacent to the lower radial sensors 108 to detect the phase of rotation of the rotor shaft 113. The controller 200 detects the position of the magnetic poles using both detection signals of the phase sensor and the rotational speed sensor.

A plurality of stator blades 123 (123a, 123b, 123c, . . . ) are arranged slightly spaced apart (by predetermined gaps) from the rotor blades 102 (102a, 102b, 102c, . . . ). Each rotor blade 102 (102a, 102b, 102c, . . . ) is inclined by a predetermined angle from a plane perpendicular to the axis of the rotor shaft 113 in order to transfer exhaust gas molecules downward through collision.

The stator blades 123 are also inclined by a predetermined angle from a plane perpendicular to the axis of the rotor shaft 113. The stator blades 123 extend inward of the outer cylinder 127 and alternate with the stages of the rotor blades 102. The outer circumference ends of the stator blades 123 are inserted between and thus supported by a plurality of layered stator blade spacers 125 (125a, 125b, 125c, . . . ).

The stator blade spacers 125 are ring-shaped members made of a metal, such as aluminum, iron, stainless steel, or copper, or an alloy containing these metals as components, for example. The outer cylinder 127 is fixed to the outer circumferences of the stator blade spacers 125 with a slight gap. A base portion 129 is located at the base of the outer cylinder 127. The base portion 129 has an outlet port 133 providing communication to the outside. The exhaust gas transferred to the base portion 129 through the inlet port 101 from the chamber (vacuum chamber) is then sent to the outlet port 133.

According to the application of the turbomolecular pump 100, a threaded spacer 131 may be provided between the lower part of the stator blade spacer 125 and the base portion 129. The threaded spacer 131 is a cylindrical member made of a metal such as aluminum, copper, stainless steel, or iron, or an alloy containing these metals as components. The threaded spacer 131 has a plurality of helical thread grooves 131a in its inner circumference surface. When exhaust gas molecules move in the rotation direction of the rotating body 103, these molecules are transferred toward the outlet port 133 in the direction of the helix of the thread grooves 131a. A rotating body lower cylindrical portion 103b extends downward from the lower part of a rotating body main portion 103a of the rotating body 103 including the rotor blades 102 (102a, 102b, 102c, . . . ). The outer circumference surface of the rotating body lower cylindrical portion 103b is cylindrical and projects toward the inner circumference surface of the threaded spacer 131. The outer circumference surface is adjacent to but separated from the inner circumference surface of the threaded spacer 131 by a predetermined gap. The exhaust gas transferred to the thread groove 131a by the rotor blades 102 and the stator blades 123 is guided by the thread groove 131a to the base portion 129.

Thus, the threaded spacer 131 and the opposed rotating body lower cylindrical portion 103b form a Holbeck type exhaust mechanism portion 204. The Holbeck type exhaust mechanism portion 204 gives directivity to the exhaust gas by rotating the rotating body lower cylindrical portion 103b relative to the threaded spacer 131, thereby improving the exhaust characteristics of the turbomolecular pump 100.

The base portion 129 is a disc-shaped member forming the base section of the turbomolecular pump 100, and is generally made of a metal such as iron, aluminum, or stainless steel. The base portion 129 physically holds the turbomolecular pump 100 and also serves as a heat conduction path. As such, the base portion 129 is preferably made of rigid metal with high thermal conductivity, such as iron, aluminum, or copper.

In this configuration, when the motor 121 drives and rotates the rotor blades 102 together with the rotor shaft 113, the interaction between the rotor blades 102 and the stator blades 123 causes the suction of exhaust gas from the chamber through the inlet port 101. The exhaust gas sucked through the inlet port 101 moves between the rotor blades 102 and the stator blades 123 and is transferred to the base portion 129. At this time, factors such as the friction heat generated when the exhaust gas comes into contact with the rotor blades 102 and the conduction of heat generated by the motor 121 increase the temperature of the rotor blades 102. This heat is conducted to the stator blades 123 through radiation or conduction via gaseous molecules (gas molecules) of the exhaust gas, for example.

The stator blade spacers 125 are joined to one another at the outer circumference portion and transfer the heat received by the stator blades 123 from the rotor blades 102, the friction heat generated when the exhaust gas comes into contact with the stator blades 123, and the like to the outside.

In the above description, the threaded spacer 131 is provided at the outer circumference of the rotating body lower cylindrical portion 103b of the rotating body 103, and the thread groove 131a is engraved in the inner circumference surface of the threaded spacer 131. However, this may be inversed in some cases, and a thread groove may be engraved in the outer circumference surface of the rotating body lower cylindrical portion 103b, while a spacer having a cylindrical inner circumference surface may be arranged around the outer circumference surface.

According to the application of the turbomolecular pump 100, to prevent the gas sucked through the inlet port 101 from entering an electrical portion, which includes the upper radial electromagnets 104, the upper radial sensors 107, the motor 121, the lower radial electromagnets 105, the lower radial sensors 108, the axial electromagnets 106A, 106B, and the axial sensor 109, the electrical portion may be surrounded by a stator column 122. The inside of the stator column 122 may be maintained at a predetermined pressure by purge gas.

In this case, the base portion 129 has a purge gas introduction pipe 13 through which the purge gas is introduced. The introduced purge gas is sent to the outlet port 133 through gaps between a protective bearing 120 and the rotor shaft 113, between the rotor and the stator of the motor 121, and between the inner cylindrical portion of the rotor blades 102 (the rotating body lower cylindrical portion 103b) and the stator column 122, or between the inner cylindrical portion of the rotor blades 102 (the rotating body lower cylindrical portion 103b) and the base portion 129 (indicated by reference numeral 210 in FIG. 5A) between a protective bearing 120 and the rotor shaft 113, between the rotor and the stator of the motor 121, and between the inner cylindrical portion of the rotor blades 102 (the rotating body lower cylindrical portion 103b) or between the stator column 122 and the inner cylindrical portion of the rotor blades 102 (the rotating body lower cylindrical portion 103b) and the base portion 129 (indicated by reference numeral 210 in FIG. 5A).

The turbomolecular pump 100 requires the identification of the model and control based on individually adjusted unique parameters (for example, various characteristics associated with the model). To store these control parameters, the turbomolecular pump 100 includes an electronic circuit portion 141 in its main body. The electronic circuit portion 141 may include a semiconductor memory, such as an EEP-ROM, electronic components such as semiconductor elements for accessing the semiconductor memory, and a substrate 143 for mounting these components. The electronic circuit portion 141 is housed under a rotational speed sensor (not shown) near the center, for example, of the base portion 129, which forms the lower part of the turbomolecular pump 100, and is closed by an airtight bottom lid 145.

Some process gas introduced into the chamber in the manufacturing process of semiconductors may have the property of becoming solid when its pressure becomes higher than a predetermined value or its temperature becomes lower than a predetermined value. In the turbomolecular pump 100, the pressure of the exhaust gas is lowest at the inlet port 101 and highest at the outlet port 133. When the pressure of the process gas increases beyond a predetermined value or its temperature decreases below a predetermined value while the process gas is being transferred from the inlet port 101 to the outlet port 133, the process gas is solidified and adheres and accumulates on the inner side of the turbomolecular pump 100.

For example, when SiCl4 is used as the process gas in an Al etching apparatus, according to the vapor pressure curve, a solid product (for example, AlCl3) is deposited at a low vacuum (760 [torr] to 10-2 [torr]) and a low temperature (about 20 [° C.]) and adheres and accumulates on the inner side of the turbomolecular pump 100. When the deposit of the process gas accumulates in the turbomolecular pump 100, the accumulation may narrow the pump flow passage and degrade the performance of the turbomolecular pump 100. The above-mentioned product tends to solidify and adhere in areas with higher pressures, such as near the outlet port and near the threaded spacer 131.

To solve this problem, conventionally, a heater or annular water cooling tube 149 (not shown) is wound around the outer circumference of the base portion 129, and a temperature sensor (e.g., a thermistor, not shown) is embedded in the base portion 129, for example. The signal of this temperature sensor is used to perform control to maintain the temperature of the base portion 129 at a constant high temperature (preset temperature) by heating with the heater or cooling with the water cooling tube 149 (hereinafter referred to as TMS (temperature management system)).

Figure 2:
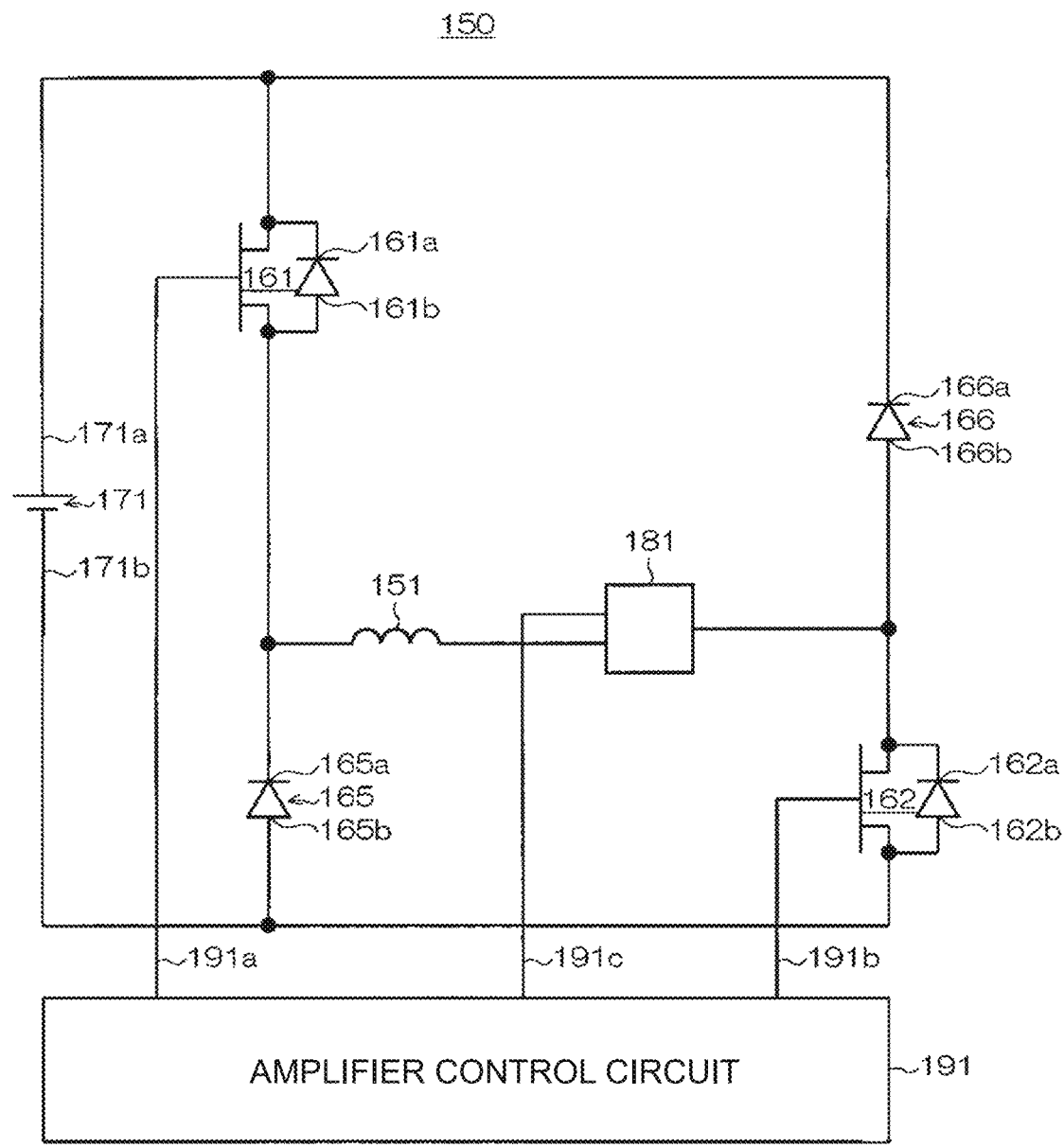
FIG. 2 is a circuit diagram of an amplifier circuit.

The amplifier circuit 150 is now described that controls and excites the upper radial electromagnets 104, the lower radial electromagnets 105, and the axial electromagnets 106A and 106B of the turbomolecular pump 100 configured as described above. FIG. 2 is a circuit diagram of the amplifier circuit.

In FIG. 2, one end of an electromagnet winding 151 forming an upper radial electromagnet 104 or the like is connected to a positive electrode 171a of a power supply 171 via a transistor 161, and the other end is connected to a negative electrode 171b of the power supply 171 via a current detection circuit 181 and a transistor 162. Each transistor 161, 162 is a power MOSFET and has a structure in which a diode is connected between the source and the drain thereof.

In the transistor 161, a cathode terminal 161a of its diode is connected to the positive electrode 171a, and an anode terminal 161b is connected to one end of the electromagnet winding 151. In the transistor 162, a cathode terminal 162a of its diode is connected to a current detection circuit 181, and an anode terminal 162b is connected to the negative electrode 171b.

A diode 165 for current regeneration has a cathode terminal 165a connected to one end of the electromagnet winding 151 and an anode terminal 165b connected to the negative electrode 171b. Similarly, a diode 166 for current regeneration has a cathode terminal 166a connected to the positive electrode 171a and an anode terminal 166b connected to the other end of the electromagnet winding 151 via the current detection circuit 181. The current detection circuit 181 may include a Hall current sensor or an electric resistance element, for example.

The amplifier circuit 150 configured as described above corresponds to one electromagnet. Accordingly, when the magnetic bearing uses 5-axis control and has ten electromagnets 104, 105, 106A, and 106B in total, an identical amplifier circuit 150 is configured for each of the electromagnets. These ten amplifier circuits 150 are connected to the power supply 171 in parallel.

An amplifier control circuit 191 may be formed by a digital signal processor portion (not shown, hereinafter referred to as a DSP portion) of the controller 200. The amplifier control circuit 191 switches the transistors 161 and 162 between on and off.

The amplifier control circuit 191 is configured to compare a current value detected by the current detection circuit 181 (a signal reflecting this current value is referred to as a current detection signal 191c) with a predetermined current command value. The result of this comparison is used to determine the magnitude of the pulse width (pulse width time Tp1, Tp2) generated in a control cycle Ts, which is one cycle in PWM control. As a result, gate drive signals 191a and 191b having this pulse width are output from the amplifier control circuit 191 to gate terminals of the transistors 161 and 162.

Under certain circumstances such as when the rotational speed of the rotating body 103 reaches a resonance point during acceleration, or when a disturbance occurs during a constant speed operation, the rotating body 103 may require positional control at high speed and with a strong force. For this purpose, a high voltage of about 50 V, for example, is used for the power supply 171 to enable a rapid increase (or decrease) in the current flowing through the electromagnet winding 151. Additionally, a capacitor is generally connected between the positive electrode 171a and the negative electrode 171b of the power supply 171 to stabilize the power supply 171 (not shown).

In this configuration, when both transistors 161 and 162 are turned on, the current flowing through the electromagnet winding 151 (hereinafter referred to as an electromagnet current iL) increases, and when both are turned off, the electromagnet current iL decreases.

Also, when one of the transistors 161 and 162 is turned on and the other is turned off, a freewheeling current is maintained. Passing the freewheeling current through the amplifier circuit 150 in this manner reduces the hysteresis loss in the amplifier circuit 150, thereby limiting the power consumption of the entire circuit to a low level. Moreover, by controlling the transistors 161 and 162 as described above, high frequency noise, such as harmonics, generated in the turbomolecular pump 100 can be reduced. Furthermore, by measuring this freewheeling current with the current detection circuit 181, the electromagnet current iL flowing through the electromagnet winding 151 can be detected.

Figure 3:
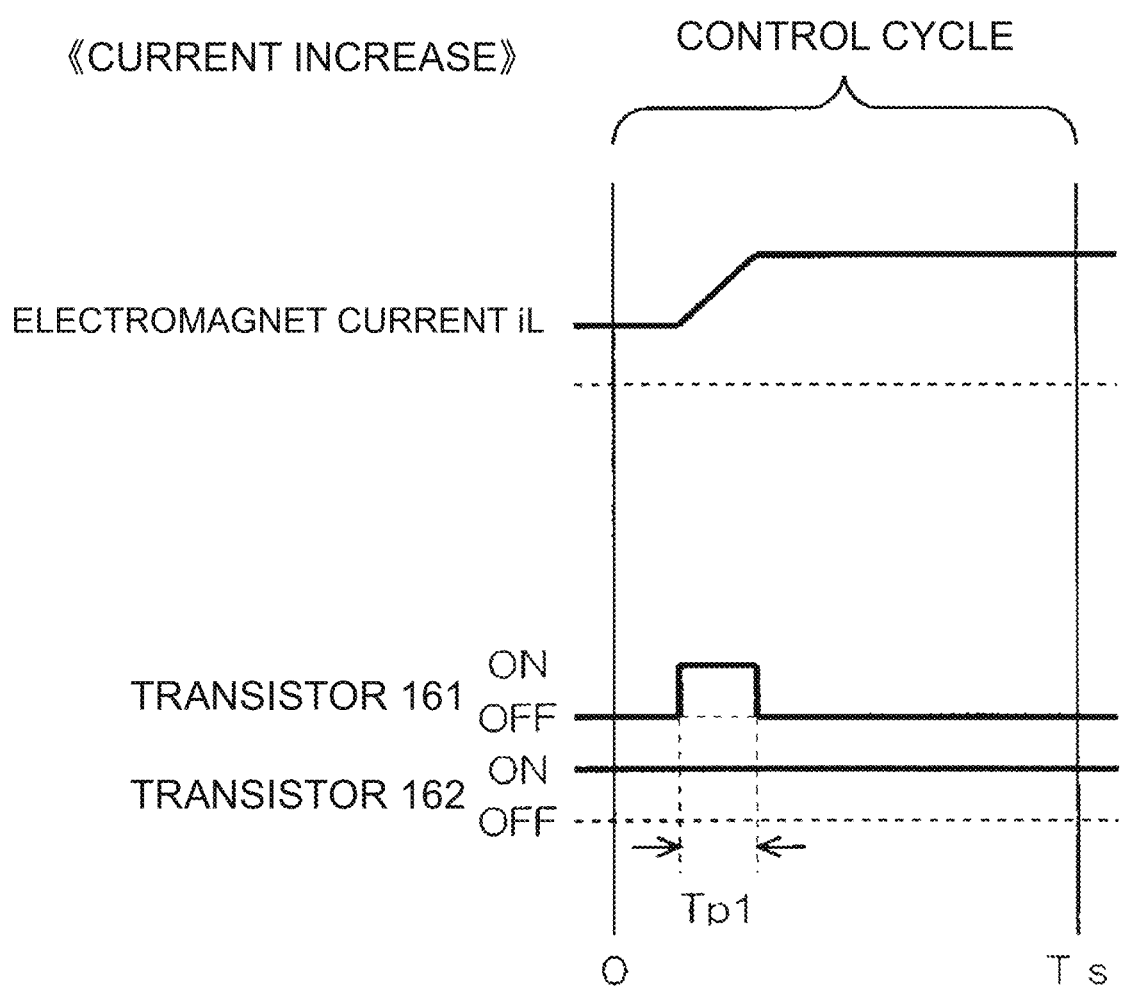
FIG. 3 is a time chart showing control performed when a current command value is greater than a detected value.

That is, when the detected current value is smaller than the current command value, as shown in FIG. 3, the transistors 161 and 162 are simultaneously on only once in the control cycle Ts (for example, 100 μs) for the time corresponding to the pulse width time Tp1. During this time, the electromagnet current iL increases accordingly toward the current value iLmax (not shown) that can be passed from the positive electrode 171a to the negative electrode 171b via the transistors 161 and 162.

Figure 4:
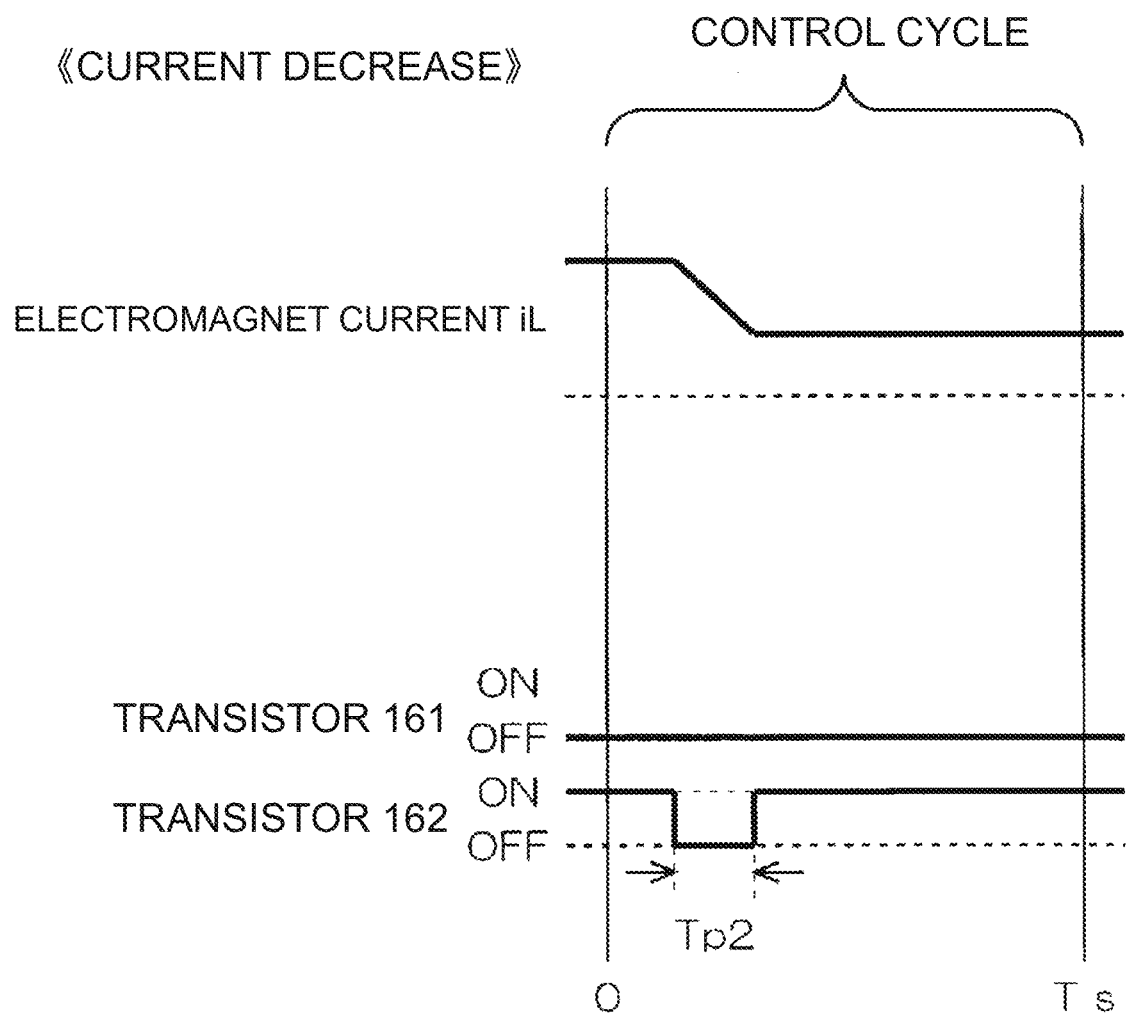
FIG. 4 is a time chart showing control performed when the current command value is smaller than the detected value.

When the detected current value is larger than the current command value, as shown in FIG. 4, the transistors 161 and 162 are simultaneously off only once in the control cycle Ts for the time corresponding to the pulse width time Tp2. During this time, the electromagnet current iL decreases accordingly toward the current value iLmin (not shown) that can be regenerated from the negative electrode 171b to the positive electrode 171a via the diodes 165 and 166.

In either case, after the pulse width time Tp1, Tp2 has elapsed, one of the transistors 161 and 162 is on. During this period, the freewheeling current is thus maintained in the amplifier circuit 150.

In the turbomolecular pump 100 with the basic configuration described above, the upper side as viewed in FIG. 1 (the side including the inlet port 101) serves as a suction portion connected to the target device, and the lower side (the side including an exhaust port 15 forming the outlet port 133 and protruding leftward as viewed in the figure from the base portion 129) serves as an exhaust portion connected to an auxiliary pump (back pump) or the like (not shown). The turbomolecular pump 100 can be used not only in an upright position in the vertical direction shown in FIG. 1, but also in an inverted position, a horizontal position, and an inclined position.

Also, in the turbomolecular pump 100, the above-mentioned outer cylinder 127 and the base portion 129 are combined to form a single case (hereinafter, they may be collectively referred to as a "main body casing" or the like). The turbomolecular pump 100 is electrically (and structurally) connected to a box-shaped electrical case (not shown), and the above-mentioned controller 200 is incorporated in the electrical case.

The configuration within the main body casing (the combination of the outer cylinder 127 and the base portion 129) of the turbomolecular pump 100 may be divided into a rotation mechanism portion, which rotates the rotor shaft 113 and the like with the motor 121, and an exhaust mechanism portion, which is rotationally driven by the rotation mechanism portion. The exhaust mechanism portion may be divided into a turbomolecular pump mechanism portion, which may include the rotor blades 102 and the stator blades 123, and a thread groove pump mechanism portion (Holbeck type exhaust mechanism portion 204), which may include the rotating body lower cylindrical portion 103b and the threaded spacer 131.

The above-mentioned purge gas (protection gas) is used to protect components such as the bearing portions and the rotor blades 102, prevents corrosion caused by the exhaust gas (process gas), and cools the rotor blades 102, for example. This purge gas may be supplied by a general technique.

For example, a purge gas port 13 extending linearly in the radial direction may be provided in a predetermined part of the base portion 129 (for example, at a position approximately 180 degrees away from the outlet port 133). The purge gas may be supplied to the purge gas port 13 from the outside of the base portion 129 via a purge gas cylinder (e.g., N2 gas cylinder), a flow rate regulator (valve device), or the like.

The protective bearing 120 described above is also referred to as a "touchdown (T/D) bearing", a "backup bearing", or the like. In case of any trouble such as trouble in the electrical system or entry of air, the protective bearing 120 prevents a significant change in the position and orientation of the rotor shaft 113, thereby limiting damage of the rotor blades 102 and surrounding portions.

In FIG. 1 showing the structure of the turbomolecular pump 100 and the rotating body 103, hatch patterns indicating cross sections of components are omitted to avoid complicating the drawing.

Weight Balance Correction (Adjustment)

FIG. 5A is an enlarged view of the portion encircled by circle A in FIG. 1. The inner circumference surface 211 of the rotating body 103 includes a groove portion 212 for weight correction. The groove portion 212 is formed by cutting the rotating body 103 perpendicularly to the inner circumference surface 211 (in the radial direction of the rotating body 103). The rotating body 103 has wall portions 213 and 214 extending at right angles to the inner circumference surface 211. The wall portions 213 and 214 face the groove portion 212.

The groove portion 212 is formed in an annular shape (also referred to as "belt shape") over the entire circumference of the inner circumference surface 211 of the rotating body. The groove portion 212 has a depth d1 that is smaller than the thickness t1 of the rotating body 103 (e.g., about 10 mm, only partly shown) and constant in both the circumferential direction and the width direction (the axial direction of the rotating body 103).

Balance weights (hereinafter referred to as "weights") 220 according to the first embodiment are fitted in the groove portion 212. In the first embodiment, the number of weights 220 is three. The three weights 220 are arranged such that, with the position of one weight 220 as the reference) (0°), the others are each positioned at 120° and 240°, or at 100° and 260°.

Figure 6:
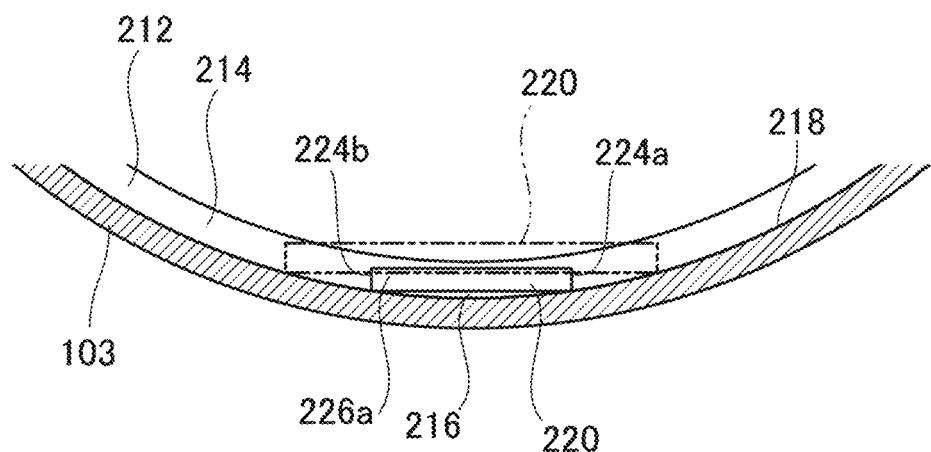
FIG. 6 is an explanatory diagram showing the weight and its surrounding portion as viewed in an axial direction of the rotating body.

As shown in FIGS. 5A, 5B, and 6, each weight 220 is processed into a rectangular flat plate shape (also referred to as "thin plate shape"). The weight 220 has a thickness t2 that is smaller than the depth d1 of the groove portion 212 and constant over the entire plate surface. The weight 220 does not protrude inward (toward the axis of the rotating body 103 in the radial direction) beyond the inner circumference surface 211 of the rotating body 103, so that the entire weight 220 is contained inside the groove portion 212.

Also, the thickness t2 of the weight 220 is greater than the dimension t3 of the gap 210 between the inner circumference surface 211 of the rotating body 103 and the base portion 129. That is, the relationship between the thickness t2 of the weight 220 and the dimension t3 of the gap 210 is t2>t3.

FIG. 6 shows the weight 220 attached to the rotating body 103 and its surrounding portion as viewed from the side corresponding to the inlet port 101. Since the groove portion 212 is formed in an annular shape with a curvature, a gap 216 having a plane cross-sectional shape (projected shape)

of a crescent is formed between the weight 220 and the base surface 218 of the groove portion 212.

As shown in FIG. 5B, the weight 220 has two displacement permitting holes 222a and 222b. Each displacement permitting hole 222a, 222b is shaped as an elongated hole and has one end opening at one side edge surface 224a, 224b of the weight 220. The displacement permitting holes 222a and 222b extend linearly and parallel to each other from one side edge surface 224a toward the other side edge surface 224a of the weight 220.

The displacement permitting holes 222a and 222b extend through the weight 220 in the thickness direction (the direction of t2 in FIG. 5A). The arrangement of the displacement permitting holes 222a and 222b provides the weight 220 with elastic displacement portions 226a and 226b connected to a weight main body portion 227. The elastic displacement portions 226a and 226b are supported by the weight main body portion 227 in a cantilever manner, and support portions 230a and 230b are formed at the proximal ends of the elastic displacement portions 226a and 226b.

In the first embodiment, the elastic displacement portions 226a and 226b are located at the ends of the weight 220 in a longitudinal direction (also referred to as "length direction"). A longitudinal direction of the weight 220 is a direction indicated by arrow B in FIG. 5B. The longitudinal direction of the weight 220 is a direction parallel to the axial direction of the rotating body 103 when the weight 220 is attached to the rotating body 103.

A lateral direction (also referred to as "width direction") of the weight 220 is a direction indicated by arrow C in FIG. 5B. The lateral direction (also referred to as "width direction") of the weight 220 is a direction along the circumferential direction of the rotating body 103 when the weight 220 is attached to the rotating body 103. The weight 220 is shaped to have point symmetry with respect to the center point indicated by reference symbol D in FIG. 5B.

Distal end portions 232a and 232b of the elastic displacement portions 226a and 226b can be elastically displaced in the directions indicated by arcuate arrows E and F in FIG. 5B around the support portions 230a and 230b. Arrows E in FIG. 5B indicate the directions in which the distal end portions 232a and 232b of the elastic displacement portions 226a and 226b are displaced counterclockwise as viewed in FIG. 5B, and arrows F indicate the directions in which the distal end portions 232a and 232b are displaced clockwise.

As shown in FIGS. 5A and 5B and FIG. 6, when a weight 220 is fitted into the groove portion 212 of the rotating body 103, the elastic displacement portions 226a and 226b apply elastic restoring forces to the wall portions 213 and 214 of the groove portion 212. The forces (tension forces) of the elastic displacement portions 226a and 226b pressing the wall portions 213 and 214 fix the weight 220 in the groove portion 212 with the weight 220 sandwiched (held) in the groove portion 212.

As described above, the weight 220 is structured to have springs at the both ends in the longitudinal direction (arrow B direction). The structure of the spring (spring structure) is formed by providing the displacement permitting holes 222a and 222b each having one open end. The displacement permitting holes 222a and 222b are shaped to have point symmetry with respect to the point D.

In the first embodiment, two sets of an elastic displacement portion (the elastic displacement portion 226a, 226b in this example) and a displacement permitting hole (the displacement permitting hole 222a, 222b in this example) are provided. However, only one set of an elastic displacement portion and a displacement permitting hole (for example, only the set of the elastic displacement portion 226a and the displacement permitting hole 222a) may be provided, and the other set of an elastic displacement portion and a displacement permitting hole (for example, the set of the elastic displacement portion 226b and the displacement permitting hole 222b) may be omitted.

Figure 7:
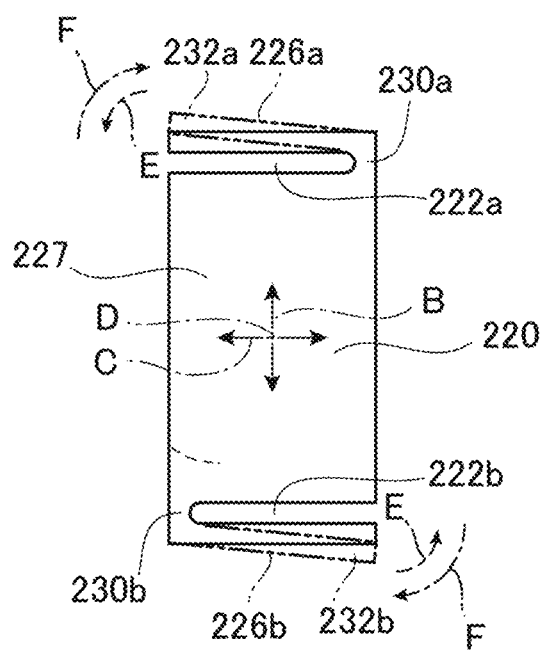
FIG. 7 is an explanatory diagram showing elastic displacement portions of a protruding shape by dashed double-dotted lines.

To provide a sufficiently large force for the elastic displacement portions 226a and 226b to press the wall portions 213 and 214, as indicated by dashed double-dotted lines in FIG. 7, for example, the weight 220 may be processed so that each elastic displacement portion 226a, 226b has a shape that extends and protrudes in a longitudinal direction (direction indicated by arrow B or direction indicated by arrow F) (hereinafter referred to as "protruding shape"). This allows the elastic displacement portion 226a, 226b to have or increase its elastic restoring force in a more reliable manner.

The elastic restoring force can also be generated by processing only the elastic displacement portion 226a (or only the elastic displacement portion 226b) into the protruding shape. As such, only one elastic displacement portion 226a (or only the elastic displacement portion 226b) may be processed in the protruding shape. However, when it is necessary to symmetrically generate spring forces (symmetrical in the longitudinal direction (arrow B direction) in this example), the elastic displacement portions are preferably symmetric (have point symmetry in the first embodiment) as with the elastic displacement portions 226a and 226b in FIGS. 5A and 5B. Furthermore, the elastic displacement portions 226a and 226b are preferably parallel to each other when they are in contact with the wall portions 213 and 214 of the groove portion 212.

When the weight 220 with the elastic displacement portion 226a (and/or 226b) processed in the protruding shape is fitted into the groove portion 212 of the rotating body 103, the operator may elastically displace (contract) the elastic displacement portion 226a (and/or 226b) with his/her fingers toward the displacement permitting hole 222a (and/or 222b) to fit the weight 220 into the groove portion 212.

It should be noted that only one elastic displacement portion (e.g., only the elastic displacement portion 226a) may be provided and the other elastic displacement portion (e.g., the elastic displacement portion 226b) may be omitted also when the elastic displacement portion 226a (and/or 226b) has the protruding shape.

The operation of detaching the weight 220 from the rotating body 103 is now described. When detaching the weight 220, the operator inserts (forces) a tool (such as the tip of a flat-blade screwdriver) between the weight 220 and the base surface 218 of the groove portion 212. Then, the tool is moved as a lever, and the weight 220 is lifted by the tip of the tool and thus separated from the rotating body 103. Then, the operator picks up the weight 220 with his/her fingers, for example.

To facilitate this operation, as shown in FIGS. 8A and 8B, grooves for detachment (hereinafter referred to as "detachment grooves") 240 may be formed in the base surface 218. The detachment grooves 240 facilitate the insertion of the tool behind the weight 220.

Furthermore, as shown in FIGS. 9A and 9B, detachment grooves 244 may be formed in a weight 242. This also facilitates the insertion of the tool between the weight 242 and the base surface 218. The detachment grooves 244 are formed at opposite sides of the weight 242 in the width direction (arrow C direction) and open at the side edge surfaces 224a and 224b. The weight 242 shown in FIGS. 9A and 9B has the same shape and structure as the weight 220 shown in FIGS. 5A and 5B, except that the weight 242 has the detachment grooves 244.

The present embodiment uses three weights 220. For example, the three weights 220 may be arranged in a reference arrangement of 120° intervals (0°, 120°, and 240°, and the arrangement may be altered to an arrangement of 0°, 100°, and 260° while checking the balance. In this manner, balance correction can be performed in grams by altering the intervals between the multiple weights 220.

As described above, according to the turbomolecular pump 100 of the first embodiment, the weight 220 (or the weight 242 shown in FIGS. 9A and 9B, hereinafter they may be collectively referred to as "weight 220 or the like") is attached for weight balance correction. Accordingly, unlike the method described in Japanese Patent Application Publication No. 2018-127950, the balance correction operation can be redone. Also, the weight 220 or the like can be freely attached and detached, allowing the attachment to be redone. Moreover, the weight 220 or the like can be attached by simply fitting it into the groove portion 212 of the rotating body 103, and can be detached with a general-purpose tool (such as a flat-blade screwdriver), enabling easy attachment and detachment.

Additionally, the attachment of the weight 220 or the like is achieved using the elastic displacement portions 226a and 226b. This provides the bonding force between the rotating body 103 and the weight 220 or the like without using an adhesive. This avoids the possibility that an adhesive or the like, as described in Japanese Patent Application Publication No. 2003-148389, would corrode by coming into contact with the process gas or degrade by prolonged exposure to high temperatures. As a result, the weight 220 or the like can be fixed stably for a long period of time, and the turbomolecular pump 100 therefore has excellent long-term stability.

Recently, the size of the rotating body 103 has been increased, and the material of the rotating body 103 has been shifted from an aluminum alloy to a stainless steel alloy. The rotating body of the present embodiment can also be made of a stainless steel alloy, instead of an aluminum alloy. In particular, in contrast to an aluminum alloy, the use of a stainless steel alloy allows for application in high temperature environments. As such, weight balance correction without the use of an adhesive or the like is advantageous.

Furthermore, using a stainless steel alloy as the material of the weight 220 or the like can increase the specific gravity of the weight 220 as compared with a configuration that uses an adhesive or the like as the weight. This increases the effect of balance correction, allowing a small weight 220 or the like to achieve efficient balance correction.

Figure 10:
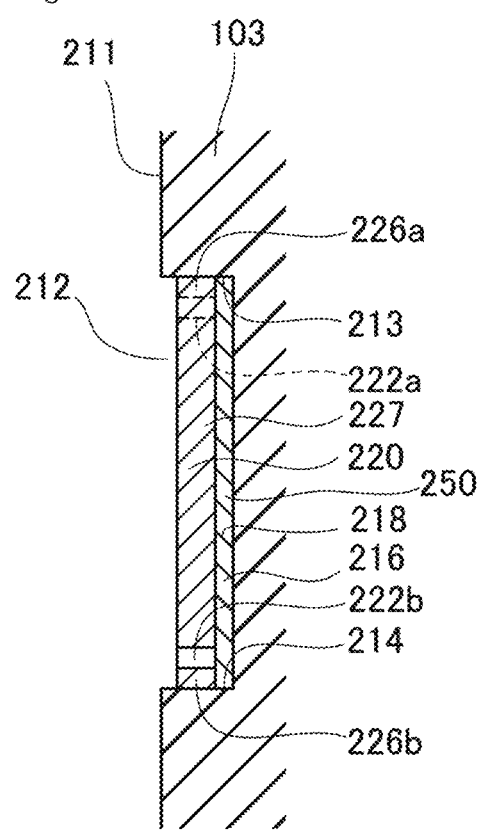
FIG. 10 is a vertical cross-sectional view showing a configuration including a weight fixed to the rotating body with an adhesive.

When the adhesive can be used, as shown in FIG. 10, the gap 216 between the weight 220 and the base surface 218 may be filled with an adhesive 250. Additionally, although not shown, the adhesive 250 may be applied between the elastic displacement portions 226a and 226b and the wall portions 213 and 214. This increases the bonding strength between the weight 220 and the rotating body 103. When a sufficient bonding strength cannot be achieved only with the elastic restoring force of the elastic displacement portions 226a and 226b, an adhesive may be added to increase the bonding strength.

Furthermore, although not shown, the plate surface of the weight 220 may be processed into a curved surface so as to conform to the base surface 218 of the groove portion 212, eliminating the gap 216 between the weight 220 and the base surface 218. Nevertheless, the weight 220 with a thin plate shape allows the elastic displacement portions 226a and 226b to be formed through punching or etching, thereby requiring less processing steps than for forming a curved surface.

For the weight 242 having the detachment grooves 244, as shown in FIGS. 9A and 9B, an adhesive may be applied in a manner that does not fill the detachment grooves 244, so that the adhesive does not prevent the detachment grooves 244 from serving their purpose.

Moreover, the present embodiment, which provides weight balance correction by attaching the weight 220 or the like, does not require screw holes or cut sections for weight balance correction such as those described in Japanese Patent Application Publication No. 2003-148389. The weight balance correction is therefore achieved without increasing areas susceptible to stress concentration, thereby reducing the risks of deformation or the like caused by areas with stress concentration.

Also, the present embodiment uses the weight 220 with a thin plate shape to provide weight balance correction. Such balance correction requires a smaller space than the container-shaped weight of Japanese Patent Application Publication No. 2002-327697 described above, for example. When a stainless steel alloy is used as the material of the weight 220, its greater specific gravity allows the effect of balance correction to be achieved with a smaller space.

Also, the thickness t2 of the weight 220 or the like is greater than the dimension t3 of the gap 210 between the inner circumference surface 211 of the rotating body 103 and the stator column 122 (t2>t3). As such, even if the weight 220 is separated from the rotating body 103 during assembly, for example, the weight 220 would not escape out of the turbomolecular pump 100 through the outlet port 133 by entering the gap 210.

Accordingly, the weight 220 is provided that is shaped to allow for easy attachment and detachment and reliable fixing to the rotating body 103. Moreover, the workability of balance correction and the reliability of the product are improved, so that the turbomolecular pump 100 that resists breaking can be provided at a low price.

As shown in FIG. 11A, the groove portion 212 of the rotating body 103 may be a dovetail groove having a shape in which the width at the opening (the opening width in the axial direction of the rotating body 103) is narrower than the width at the base (a tapered shape in which the base width is greater than the opening width). When the groove portion 212 is a dovetail groove, the wall portions 253 and 254 facing the groove portion 212 are inclined with respect to the radial direction of the rotating body 103.

When the groove portion 212 is a dovetail groove, the shapes of the end surfaces 255a and 255b of the elastic displacement portions 226a and 226b of the weight 220 may be inclined so as to conform to the inclination of the wall portions 253 and 254 as shown in FIG. 11B. The configuration shown in FIG. 11B increases the area of contact between the elastic displacement portions 226a and 226b and the wall portions 253 and 254.

The first embodiment uses three weights 220 for balance adjustment, and the weights 220 may have different weights. In this case, in place of or in addition to the weight 220, weights may be used that have displacement permitting holes 222a and 222b of different lengths, widths, shapes, and/or combinations thereof. Furthermore, the weight 220 of the first embodiment may be used in combination with weights of second to sixth embodiments (weights 242, 260, 270, 280, 290, 300) described below. The use of weights of different weights allows for more precise balance adjustment.

Other Embodiments Relating to Weights

The shapes of the displacement permitting hole (e.g., the displacement permitting hole 222a, 222b) and the elastic displacement portion (e.g., the elastic displacement portion 226a, 226b) formed in the weight (e.g., the weight 220) are not limited to those of the first embodiment, and may be modified to various shapes. Other embodiments are now described in which the displacement permitting holes have different shapes. The descriptions of the parts that are the same as parts of the first embodiment are omitted where appropriate.

Second Embodiment

FIG. 12A shows a weight 260 of a second embodiment. In the weight 260 of the second embodiment, one elastic displacement portion 262a (and an elastic displacement portion 262b) is formed by opening two displacement permitting holes 263a and 264a (and displacement permitting holes 263b and 264b). The displacement permitting holes 263a and 264a (and 263b and 264b) open at one end in opposite directions.

The elastic displacement portion 262a (and the elastic displacement portion 262b) is bent in a U shape and has two support portions 265a and 266a (and support portions 265b and 266b). The shape of the elastic displacement portion 262a (or 262b) can be regarded as the shape of the letter S in combination with a weight main body portion 267 of the weight 260.

The elastic displacement portion 262a (and the elastic displacement portion 262b) can be elastically displaced around two support portions 265a and 266a (and support portions 265b and 266b). This provides a configuration similar to that of springs arranged in series, thereby increasing the flexibility of the elastic displacement portions 226a and 226b. Accordingly, the elastic displacement portions 262a and 262b can be displaced substantially with a small force.

Since the support portions 265a and 266a (and the support portions 265b and 266b) are bent sections, they can also be referred to as "bent portions". Alternatively, only the support portions 265a and 265b provided in the intermediate sections (the sections closer to the distal ends) of the elastic displacement portions 262a and 262b may be referred to as "bent portions".

The elastic displacement portions 262a and 262b that are bent to increase their lengths have the following advantages. For example, the elastic displacement portions 226a and 226b of the first embodiment (FIG. 5B) can be lengthened so that the elastic displacement portions 226a and 226b are more flexible and displaced substantially with a smaller force.

However, lengthening the elastic displacement portions 226a and 226b also increases the size of the weight 220 as indicated by the dashed double-dotted line in FIG. 6, for example. In FIG. 6, the weight 220 of the size of the first embodiment is indicated by a solid line, and the enlarged weight 220 is indicated by an imaginary line (dashed double-dotted line).

When the size of the weight 220 is excessively increased in the width direction (direction of arrow C in FIG. 5B), the weight 220 (dashed double-dotted line) protrudes beyond the inner circumference surface 211 of the rotating body 103 as shown in FIG. 6 because the groove portion 212 and the base surface 218 of the rotating body 103 are formed in a curved shape with a curvature. Accordingly, it is not desirable to excessively increase the size of the weight 220 in the circumferential direction of the rotating body 103.

In this respect, the weight 260 of the second embodiment has the elastic displacement portions 262a and 262b that are bent to increase their length. Thus, the flexibility of the elastic displacement portions 262a and 262b can be increased without excessively increasing their size.

It should be noted that it is also possible to provide only one of the elastic displacement portions 262a and 262b according to the second embodiment. Furthermore, although not shown, at least one of the elastic displacement portions 262a and 262b may have a protruding shape extending in the longitudinal direction (direction of arrow B).

Third Embodiment

FIG. 12B shows a weight 270 of a third embodiment. The weight 270 of the third embodiment has L-shaped displacement permitting holes 274a and 274b and L-shaped elastic displacement portions 272a and 272b. The displacement permitting holes 274a and 274b and the elastic displacement portions 272a and 272b extend in both the lateral direction (arrow C) and the longitudinal direction (arrow B) of the weight 270. Reference numeral 277 in FIG. 12B indicates the weight main body portion.

In also the weight 270 of the third embodiment, one elastic displacement portion 272a (and the elastic displacement portion 272b) has two support portions 275a and 276a (and support portions 275b and 276b). The support portions 275a and 276a form bent portions. The displacement permitting holes 274a and 274b have bending points 278a and 278b, respectively. Thus, in a similar manner as the weight 260 of the second embodiment, the elastic displacement portions 272a and 272b can be displaced substantially with a small force.

It should be noted that it is also possible to provide only one of the elastic displacement portions 272a and 272b according to the third embodiment. Furthermore, although not shown, at least one of the elastic displacement portions 272a and 272b may have a protruding shape extending in the longitudinal direction (direction of arrow B).

Fourth Embodiment

FIG. 13A shows a weight 280 of a fourth embodiment. The weight 280 of the fourth embodiment has a displacement permitting hole 284 with two closed ends. Opposite ends of an elastic displacement portion 282 are connected to a weight main body portion 286. Both ends of the elastic displacement portion 282 serve as support portions 288. The elastic displacement portion 282 is supported by the support portions 288 arranged in parallel.

The elastic displacement portion 282 and the displacement permitting hole 284 are both formed in an arcuate shape. The elastic displacement portion 282 is formed in a protruding shape protruding in one of the longitudinal directions (arrow B) of the weight 280. The central portion of the elastic displacement portion 282 in the width direction (arrow C direction) forms a bending point 289A. Also, the central portion of the displacement permitting hole 284 forms a bending point 289B. The weight 280 is shaped to have line symmetry with respect to the center line G extending in the length direction.

When the weight 280 of the fourth embodiment is fitted in the groove portion 212 (referring again to FIGS. 5A and 5B), the elastic displacement portion 282 is pressed toward the weight main body portion 286 and elastically displaced within the range of the displacement permitting hole 284. As indicated by the dashed double-dotted lines, the elastic displacement portion 282 is displaced to be parallel to the width direction (arrow C direction) and brought into contact with the wall portion 213 (referring again to FIGS. 5A and 5B) while applying elastic restoring force.

Unlike the first to third embodiments, the displacement permitting hole 284 in the weight 280 of the fourth embodiment is a closed hole. The displacement permitting holes 222a and 222b (FIG. 5B) of the first embodiment, the displacement permitting holes 263a, 264a, 263b, and 264b (FIG. 12A) of the second embodiment, and the displacement permitting holes 274a and 274b (FIG. 12B) of the third embodiment may give higher flexibility. However, when sufficient flexibility can be obtained with a closed displacement permitting hole (the displacement permitting hole 284) as in the fourth embodiment, the displacement permitting hole does not necessarily have to be an open hole.

The example of FIG. 13A has only one set of the elastic displacement portion 282 and the displacement permitting hole 284, but the set of the elastic displacement portion 282 and the displacement permitting hole 284 may be formed at each end of the weight 280 in the length direction. Also, three or more sets of the elastic displacement portion 282 and the displacement permitting hole 284 may be provided.

Fifth Embodiment

FIG. 13B shows a weight 290 of a fifth embodiment. The weight 290 of the fifth embodiment has an elliptical elastic displacement portion 292. The elastic displacement portion 292 is supported by a narrow neck-shaped support portion 296. An arcuate displacement permitting hole 294 is formed inside the elastic displacement portion 292, and the portions at opposite ends in the width direction (corresponding to the width direction of the weight 290 (arrow B direction)) of the elastic displacement portion 292 serve as support portions 298.

In a similar manner as the elastic displacement portion 282 of the fourth embodiment, the elastic displacement portion 292 is formed in a protruding shape protruding in one of the longitudinal directions (arrow B direction) of the weight 290. The central portion of the elastic displacement portion 292 in the width direction (arrow C direction) forms bending points 297a and 297b. Also, the central portion of the displacement permitting hole 294 forms a bending point 299. The weight 290 is shaped to have line symmetry with respect to the center line G.

For example, the narrow neck-shaped support portion 296 may be referred to as a "central support portion", and the support portions 298 at opposite ends of the elastic displacement portion 292 may be referred to as "opposite end support portions" to distinguish them. Reference numeral 299 in FIG. 13B indicates the weight main body portion.

The example of FIG. 13B has only one set of the elastic displacement portion 292 and the displacement permitting hole 294, but the set of the elastic displacement portion 292 and the displacement permitting hole 294 may be formed at each end of the weight 290 in the longitudinal direction (arrow B direction).

Sixth Embodiment

FIG. 13C shows a weight 300 of a sixth embodiment. The weight 300 of the sixth embodiment has a displacement permitting hole 304 that has two closed ends and the shape of the letter U (or inverted letter U). The elastic displacement portion 302 also has the shape of the letter U (or inverted letter U). The weight 300 includes two support portions (also referred to as "intermediate support portions") 306 located in the intermediate sections of the elastic displacement portion 302 and two support portions (also referred to as "proximal support portion") 308 located at the proximal ends.

As in the elastic displacement portion 282 of the fourth embodiment and the elastic displacement portion 292 of the fifth embodiment, the elastic displacement portion 302 is formed in a protruding shape protruding in a length direction of the weight 300. The central portion of the elastic displacement portion 302 in the width direction (arrow C direction) forms a bending point 307. Furthermore, the displacement permitting hole 304 forms three bending points 308a to 308c. The weight 300 is shaped to have line symmetry with respect to the center line G. Reference numeral 309 in FIG. 13C indicates the weight main body portion.

The example of FIG. 13C has only one set of the elastic displacement portion 302 and the displacement permitting hole 304, but the set of the elastic displacement portion 302 and the displacement permitting hole 304 may be formed at each end of the weight 300 in the longitudinal direction (arrow B direction).

Invention That Can Be Extracted from Embodiments

As described above, a vacuum pump (e.g., the turbomolecular pump 100) according to the present application has the following features.

(1) The vacuum pump according to the present application includes:
- a casing (e.g., the main body casing (combination of the outer cylinder 127 and the base portion 129));
- a rotating body (e.g., the rotating body 103) that is enclosed and rotationally supported by the casing; and
- a driving mechanism (e.g., the motor 121) for the rotating body,
- wherein a plate-shaped balance correction member (e.g., the weight 220, 242, 260, 270, 280, 290, 300) is placed in a recess (e.g., the groove 212) provided in an inner circumference surface (e.g., the inner circumference surface 211) of the rotating body.

(2) In one embodiment of the vacuum pump according to (1),
- the balance correction member at least partially includes a spring structure portion (e.g., the elastic displacement portion 226a, 226b, 262a, 262b, 272a, 272b, 282, 292, 302) and is held in the recess.

(3) In one embodiment of the vacuum pump according to (2),
- the spring structure portion includes a hole (e.g., the displacement permitting hole 222a, 222b, 263a, 263b, 264a, 264b, 274a, 274b according to the first to third embodiments) that is provided in the balance correction member and has one open end.

(4) In one embodiment of the vacuum pump according to (3),
- the hole has at least one bending point (e.g., the bending point 278a, 278b, 289B, 299, 308a to 308c according to the third to sixth embodiments).

(5) In one embodiment of the vacuum pump according to any one of (2) to (4), the recess is a dovetail groove (e.g., the groove portion 212 of FIGS. 11A and 11B according to a modification of the first embodiment, and the groove portions 212 of the second to sixth embodiments to which this modification is applied).

(6) In one embodiment of the vacuum pump according to any one of (2) to (4), the spring structure portion has a structure that has point symmetry with respect to a center of the balance correction member (point symmetry with respect to the center point D of the first to third embodiments).

(7) In one embodiment of the vacuum pump according to (6), the recess is a dovetail groove (e.g., the groove portion 212 of FIGS. 11A and 11B according to a modification of the first embodiment, and the groove portions 212 of the second and third embodiments to which this modification is applied).

(8) A rotating body for a vacuum pump according to the present application is a rotating body for a vacuum pump (e.g., the rotating body 103) configured to be enclosed and rotationally supported by a casing (e.g., the main body casing (combination of the outer cylinder 127 and the base portion 129)) and driven by a driving mechanism (e.g., the motor 121), and a recess (e.g., the groove portion 212) in which a plate-shaped balance correction member (e.g., the weight 220, 242, 260, 270, 280, 290, 300) is to be placed is provided in an inner circumference surface (e.g., the inner circumference surface 211).

(9) A balance correction member for a vacuum pump according to the present application is a balance correction member for a vacuum pump (e. g., the weight 220, 242, 260, 270, 280, 290, 300) configured to be attached to a rotating body for a vacuum pump (e.g., the rotating body 103) that is enclosed and rotationally supported by a casing (e.g., the main body casing (combination of the outer cylinder 127 and the base portion 129)) and driven by a driving mechanism (e.g., the motor 121), the balance correction member is plate-shaped, and the balance correction member is configured to be placed in a recess (e.g., the groove portion 212) provided in an inner circumference surface (e.g., the inner circumference surface 211) of the rotating body for a vacuum pump.

The present invention is not limited to the above-described embodiments, and various modifications and combinations of the embodiments can be made without departing from the scope of the invention.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:
a casing;
a rotating body that is enclosed by the casing; and
a motor for the rotating body
wherein a plate shaped weight is placed in a recess provided in an inner circumference surface of the rotating body,
the plate shaped weight at least partially includes a spring structure portion and is held in the recess such that an entirety of the plate shaped weight is between a bottom surface defining the recess and a top surface defining the recess,
wherein the spring structure portion is formed by providing a first hole and a second hole in the plate shaped weight, the first hole being open along a first side of the plate shaped weight and closed along a second side of the plate shaped weight, and the second hole being open along the second side of the plate shaped weight and closed along the first side of the plate shaped weight, and
wherein a lateral section of the first hole and the second hole has a constant size in a longitudinal direction when the plate shaped weight is held in the recess.

2. The vacuum pump according to claim 1, the hole penetrate linearly from one side of the plate shaped weight through another side of the plate shaped weight in a radial direction of the rotating body when the plate shaped weight is in the recess.

3. The vacuum pump according to claim 1, wherein the holes have at least one bending point.

4. The vacuum pump according to claim 1, wherein the recess is a dovetail groove.

5. The vacuum pump according to claim 1, wherein the spring structure portion has a structure that is point symmetry with respect to a center of the plate shaped weight.

6. The vacuum pump according to claim 5, wherein the recess is a dovetail groove.

* * * * *